(12) United States Patent
Nagase et al.

(10) Patent No.: US 8,264,747 B2
(45) Date of Patent: Sep. 11, 2012

(54) IMAGE READING DEVICE AND IMAGE READING METHOD

(75) Inventors: Masaki Nagase, Kanagawa (JP); Tohru Kanno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1114 days.

(21) Appl. No.: 12/119,941

(22) Filed: May 13, 2008

(65) Prior Publication Data

US 2008/0297616 A1 Dec. 4, 2008

(30) Foreign Application Priority Data

May 28, 2007 (JP) .................................. 2007-140173
Apr. 15, 2008 (JP) .................................. 2008-106117

(51) Int. Cl.
*H04N 1/04* (2006.01)
*H04N 1/46* (2006.01)
*H04N 1/40* (2006.01)

(52) U.S. Cl. .................. 358/474; 358/445; 358/505
(58) Field of Classification Search .................. None
See application file for complete search history.

(56) References Cited

U.S. PATENT DOCUMENTS

| | | | |
|---|---|---|---|
| 5,408,113 A | 4/1995 | Kanno et al. | |
| 6,198,349 B1 | 3/2001 | Kanno et al. | |
| 6,426,804 B1 | 7/2002 | Kanno et al. | |
| 2004/0047007 A1 | 3/2004 | Kanno | |
| 2007/0188638 A1 | 8/2007 | Nakazawa et al. | |
| 2008/0024842 A1 | 1/2008 | Tsukahara et al. | |
| 2008/0068467 A1 | 3/2008 | Kanno et al. | |
| 2008/0068683 A1 | 3/2008 | Kanno | |

FOREIGN PATENT DOCUMENTS

| | | | |
|---|---|---|---|
| JP | 2002-142086 | | 5/2002 |
| JP | 2002142086 A | * | 5/2002 |
| JP | 2005-94161 | | 4/2005 |
| JP | 2005-142713 | | 6/2005 |
| JP | 2005-217459 | | 8/2005 |
| JP | 3846670 | | 9/2006 |

OTHER PUBLICATIONS

U.S. Appl. No. 11/723,426, filed Mar. 20, 2007.

* cited by examiner

*Primary Examiner* — Thierry Pham
(74) *Attorney, Agent, or Firm* — Oblon, Spivak, McClelland, Maier & Neustadt. L.L.P.

(57) ABSTRACT

In an image reading device, a sampling-and-holding circuit generates a plurality of analog image signals by sampling an image signal at each sampling-and-holding timing and holding sampled image signals for a predetermined amount of time, an analog-to-digital converting unit converts the analog image signals into a plurality of digital image signals at each sampling-and-holding timing, a phase regulating unit performs phase regulation of each sampling-and-holding timing based on corresponding digital image signals to obtain phase-regulated sampling-and-holding timing. The sampling-and-holding circuit generates the analog image signal at each phase-regulated sampling-and-holding timing.

4 Claims, 18 Drawing Sheets

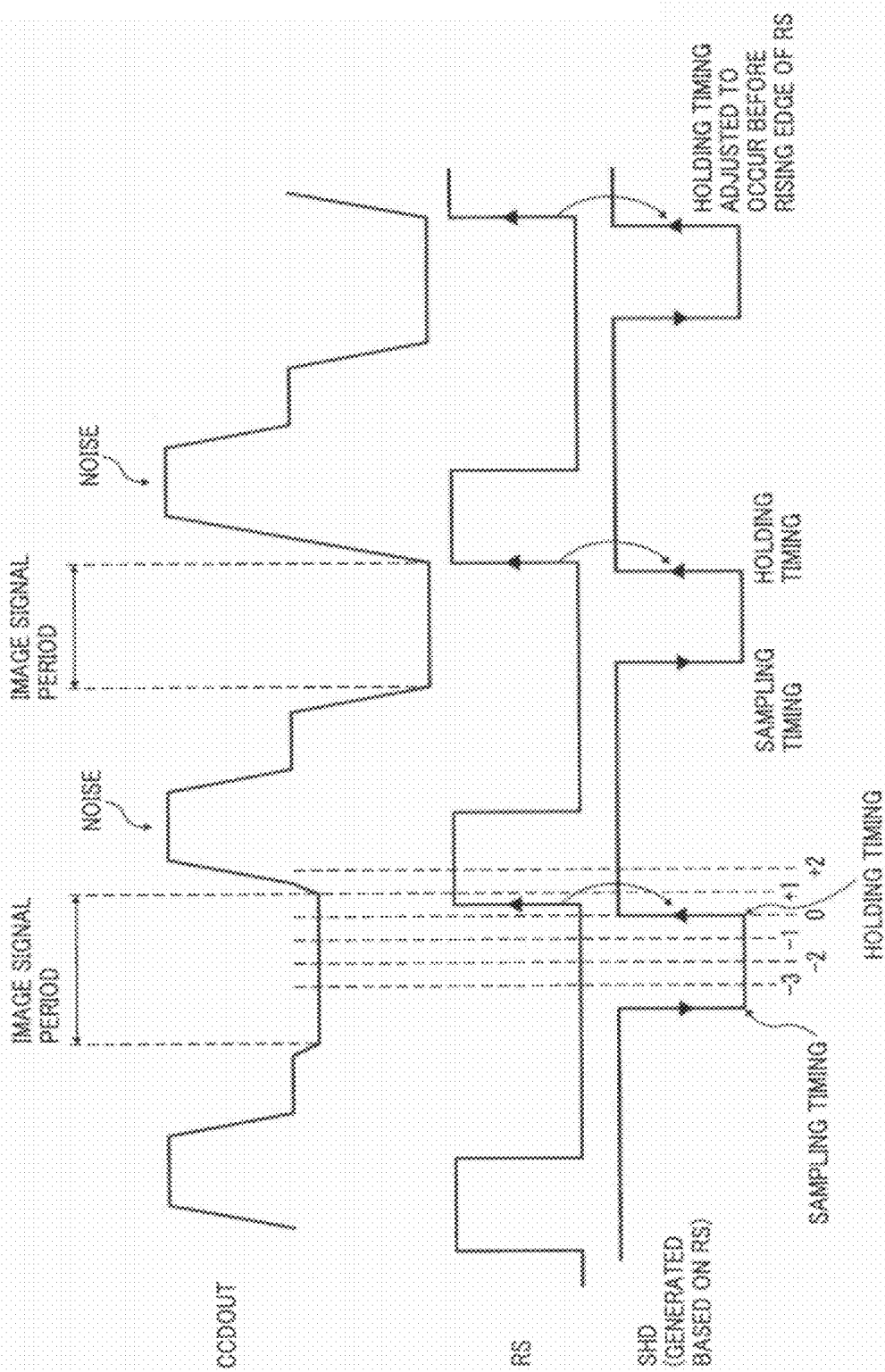

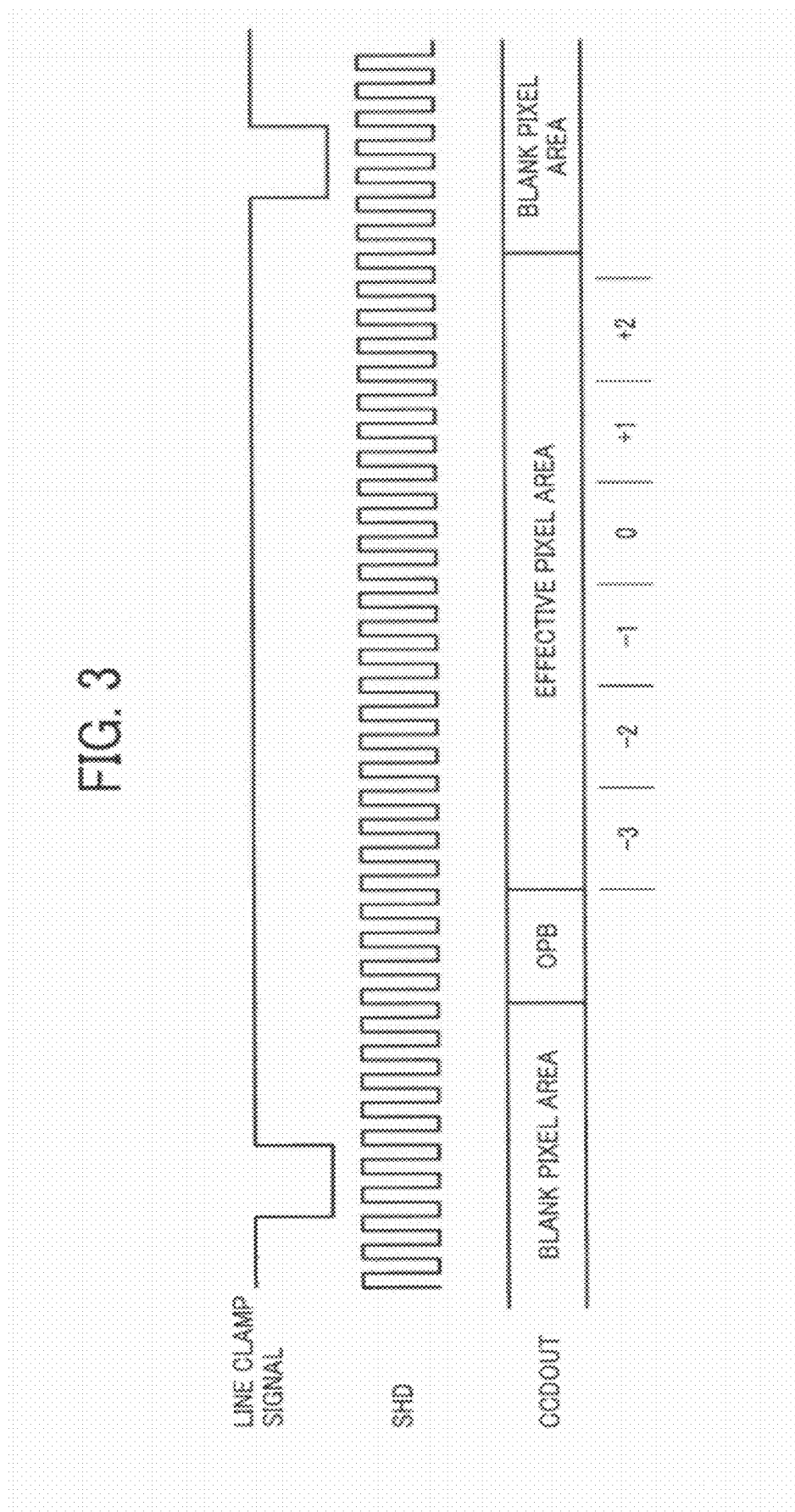

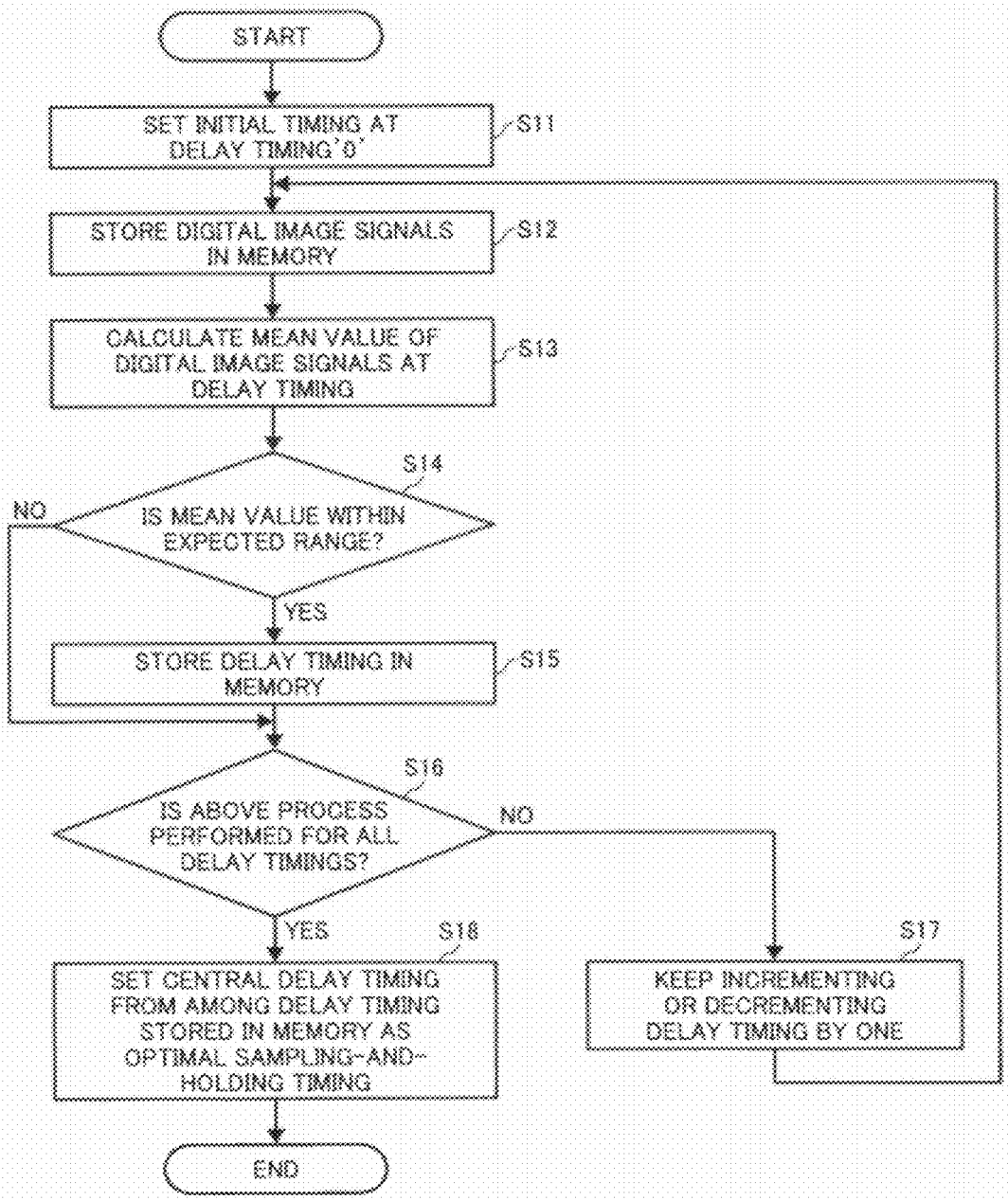

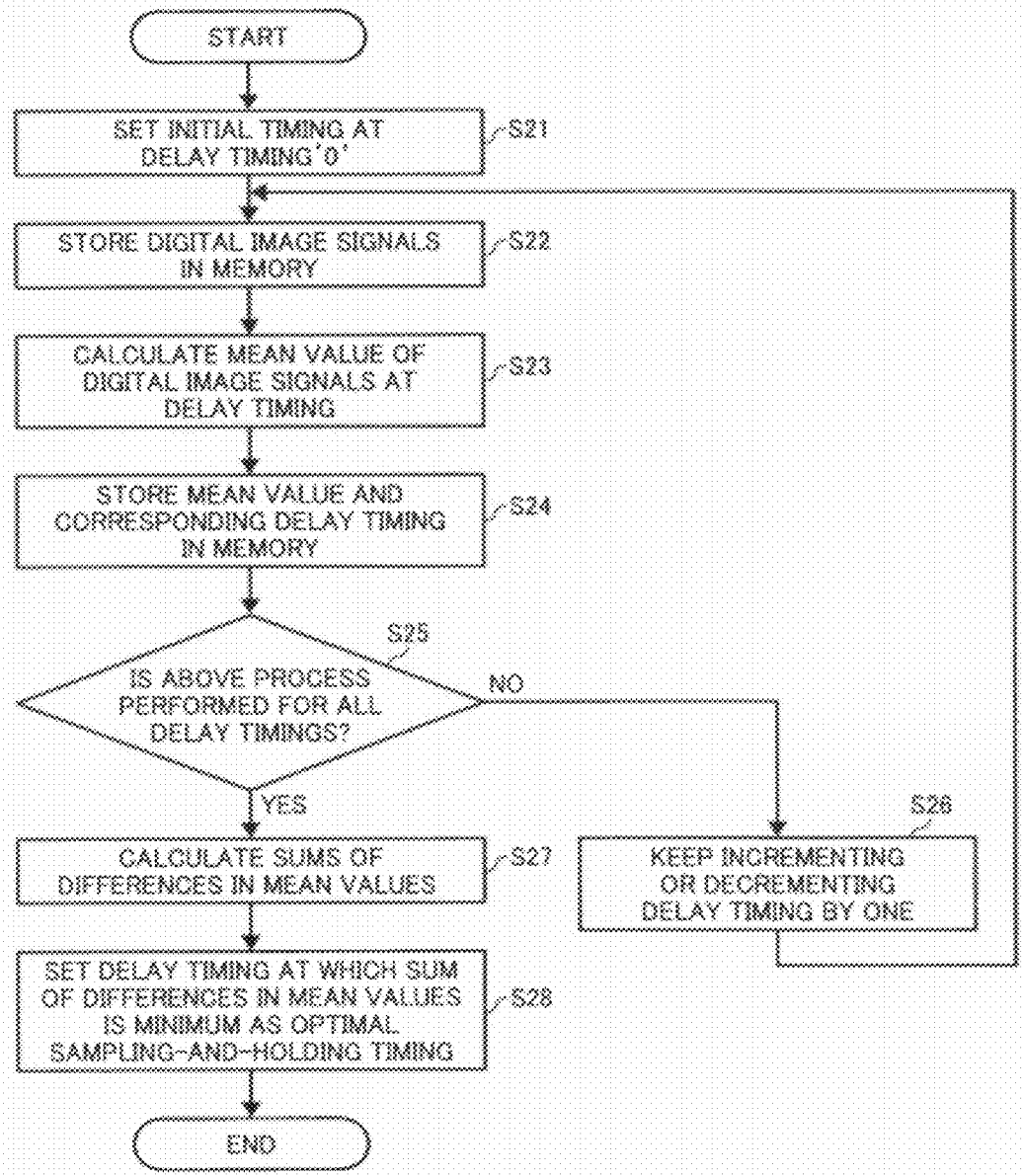

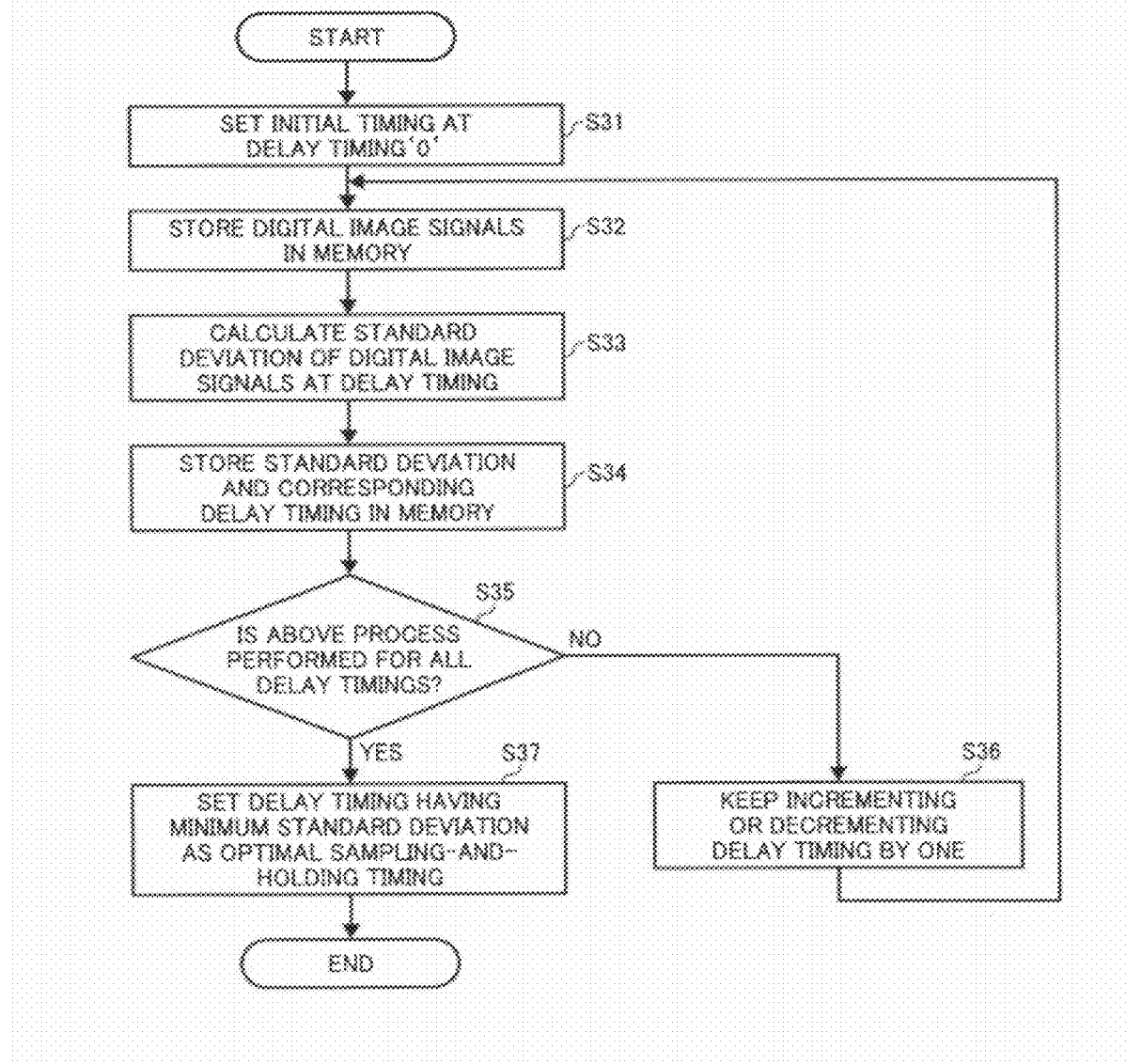

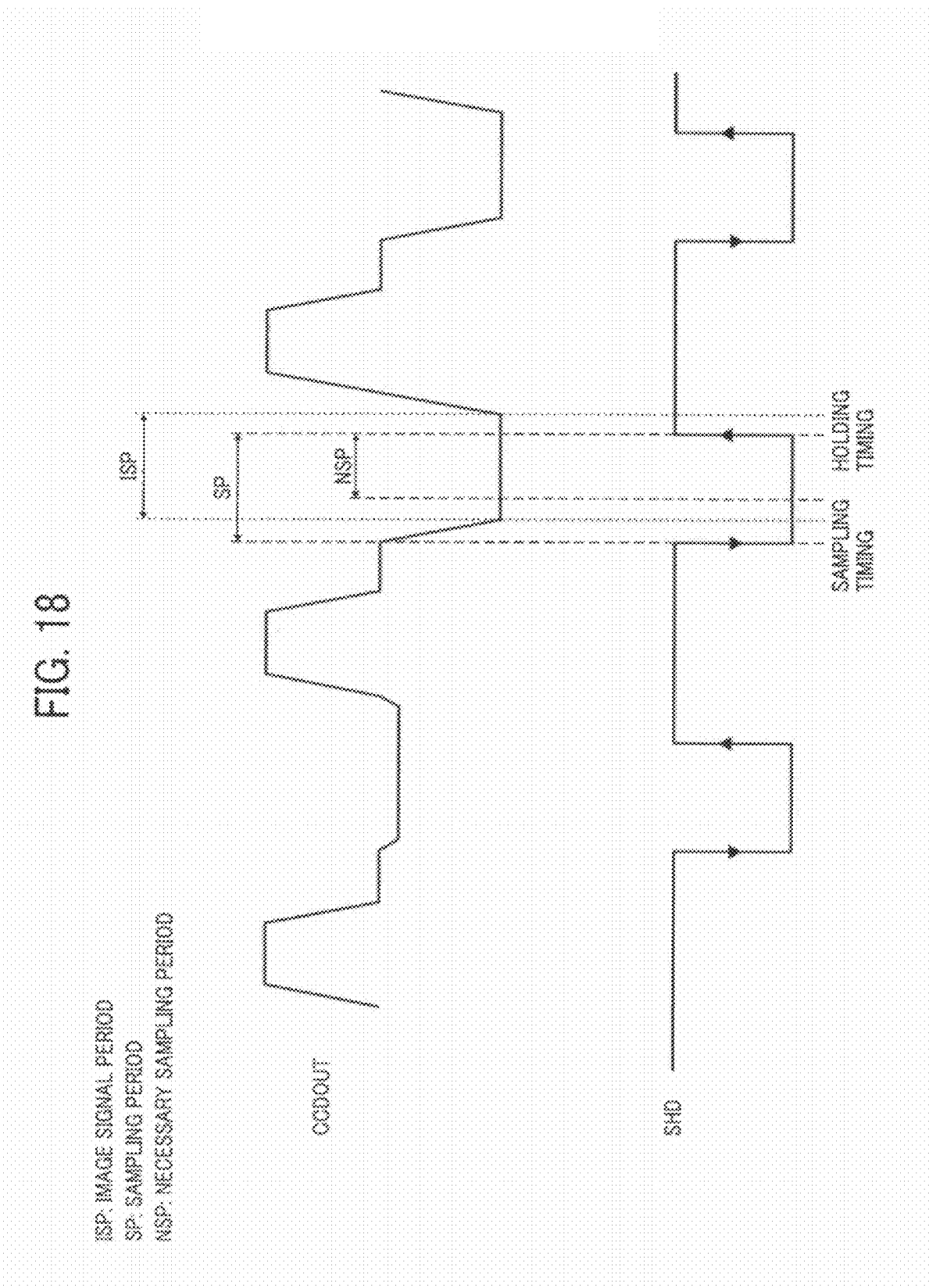

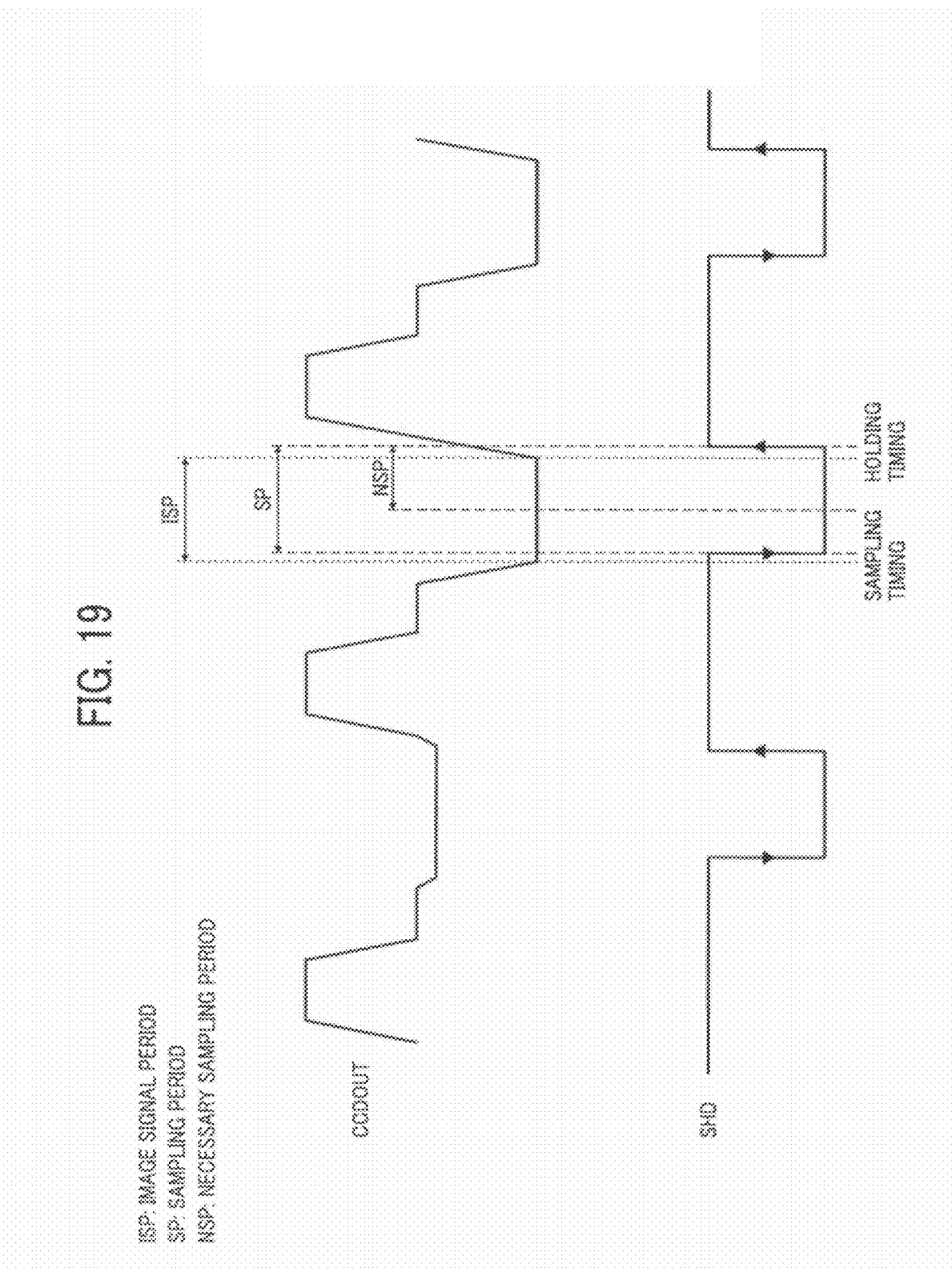

IMAGE READING DEVICE AND IMAGE READING METHOD

CROSS-REFERENCE TO RELATED APPLICATIONS

The present application claims priority to and incorporates by reference the entire contents of Japanese priority document 2007-140173 filed in Japan on May 28, 2007 and 2008-106117 filed in Japan on Apr. 15, 2008.

BACKGROUND OF THE INVENTION

1. Field of the Invention

The present invention relates to an image reading device and a method of image reading.

2. Description of the Related Art

Generally, in an image reading device, when reading an image printed on an original, the original is irradiated with a light and the light reflected from the original is received in a charged-coupled device (CCD) line image sensor for converting into an analog image signal. Subsequently, the analog image signal is subjected to sampling thereby converting the analog image signal to digital image signal.

FIG. 15 is a schematic diagram of an optical system in a typical image reading device. As shown in FIG. 15, an exposure glass 2 is arranged on the top surface of a housing 1 of the image reading device. An original 3 having an image printed thereon is mounted between the exposure glass 2 and a pressure plate (not shown). The pressure plate presses the original 3 so that the surface of the original 3 with the image (hereinafter, "target surface") is in close contact with the exposure glass 2. A white standard board 4 is arranged at the left end of the exposure glass 2, from where the image reading device starts reading the image on the original 3. The white standard board 4 is used to obtain a white shading correction image.

The target surface is irradiated with a light from a light source 5. The light reflected from the target surface then sequentially reflects from a first mirror 6, a second mirror 7, and a third mirror 8, and eventually falls on a lens 11. The lens 11 focuses the light on a charged-coupled device (CCD) line image sensor 13 arranged on an image-reading control plate 12.

The light source 5 and the first mirror 6 are mounted on a first carriage 9 that moves back and forth in a sub-scanning direction SS. Similarly, the second mirror 7 and the third mirror 8 are mounted on a second carriage 10 that also moves back and forth in the sub-scanning direction SS. The second carriage 10 moves at half the speed of the first carriage 9 such that the optical path length between the exposure glass 2 and the CCD line image sensor 13 is maintained constant.

A scanner motor 14 moves the first carriage 9 and the second carriage 10.

FIG. 16 is a schematic diagram of a signal processing unit in the image reading device that performs analog to digital conversion of signals output from the CCD line image sensor 13.

First, the CCD line image sensor 13 outputs an analog image signal in synchronization with input of a driving pulse signal. The analog image signal then passes through a buffer circuit 22 (usually, an emitter-follower circuit) to a capacitor 23. The analog image signal is subjected to alternating-current (AC) coupling in the capacitor 23 and then input into an analog integrated circuit application 28, which is an analog front end (AFE).

The analog integrated circuit application 28 includes a clamping circuit 24, a sampling-and-holding circuit (S/H) 25, a programmable gain amplifier (PGA) 26, and an analog-to-digital converter (ADC) 27. In the analog integrated circuit application 28, the clamping circuit 24 receives the AC-coupled analog image signal from the capacitor 23 and clamps a black offset level of the AC-coupled analog image signal to a predetermined voltage in synchronization with input of a clamp signal CLP and outputs the clamped analog image signal.

The sampling-and-holding circuit 25 outputs a continuous analog image signal by sampling the clamped analog image signal in synchronization with input of a sampling-and-holding pulse SHD and holding the sampled analog image signal for a predetermined amount of time. The PGA 26 amplifies the continuous analog image signal to a predetermined signal level and outputs the amplified analog image signal. The ADC circuit 27 then converts the amplified analog image signal into, e.g., a 10-bit digital image signal in synchronization with input of a conversion timing signal ADCLK and outputs the digital image signal to an image processing unit (not shown) arranged subsequently.

Meanwhile, the light source 5 also illuminates the white standard board 4 such that the CCD line image sensor 13 receives the light reflected from the white standard board 4. Based on that, a shading correction circuit (not shown) in the image processing unit obtains a predetermined level of image density and corrects sensitivity fluctuation of the CCD line image sensor 13 or unevenness in the light distribution of the optical system in the image reading device. Moreover, the shading correction circuit also performs digital processing such as gamma correction on the digital image signals.

A timing signal generating circuit 1630 generates various timing signals necessary for driving the CCD line image sensor 13 and the analog integrated circuit application 28 based on an output signal of an oscillator (OSC) 29, and outputs the timing signals to the CCD line image sensor 13 and each circuit in the analog integrated circuit application 28.

The timing signal generating circuit 1630 includes a phase locked loop (PLL) circuit 30a, five signal-dividing and phase-regulating circuits (hereinafter, "phase regulating circuits") 1630b, 1630c, 1630d, 1630e, and 1630f, and a buffer 30p corresponding to each of the phase regulating circuits.

The PLL circuit 30a performs signal multiplication on the output signal of the oscillator 29 and transmits the multiplied output signal to the phase regulating circuits 1630b, 1630c, 1630d, 1630e, and 1630f. The multiplied output signal is appropriately divided between the phase regulating circuits 1630b, 1630c, 1630d, 1630e, and 1630f for generating necessary timing signals.

More particularly, the phase regulating circuit 1630b generates clock signals $\phi 1$ and $\phi 2$ used for sampling of an image light in the CCD line image sensor 13, and a timing signal TG. The phase regulating circuit 1630c generates clock signals $\phi 2L$ and CP used for the signal output from the CCD line image sensor 13, and a reset signal RS. The phase regulating circuit 1630d generates the clamp signal CLP and outputs it to the clamping circuit 24. The phase regulating circuit 1630e generates the sampling-and-holding pulse SHD and outputs it to the sampling-and-holding circuit 25 via the buffer 30p. The phase regulating circuit 1630f generates the conversion timing signal ADCLK and outputs it to the ADC circuit 27.

The clock signals $\phi 1$ and $\phi 2$ are transfer clock signals for transferring a signal charge obtained from a photodiode array (not shown) in the CCD line image sensor 13 to an analog shift register (not shown) and then performing charge transfer from the analog shift register. The timing signal TG is used for transferring a charge accumulated in the photodiode between two exposure timings to the analog shift register. The reset signal RS is a timing clock signal that initializes a voltage of a floating capacitor (not shown) in a source-follower circuit (not shown) in the CCD line image sensor 13 for outputting the analog image signal, for each pixel of the analog image signal. The clock signal CP is a timing clock signal that determines an internal clamping timing in the CCD line image sensor 13 such that an offset voltage of an output waveform of the CCD line image sensor 13 is set.

A central processing unit (CPU) 1639 controls a timing for driving the CCD line image sensor 13 and phase regulation of the timing signal generating circuit 1630.

FIG. 17 is a circuit diagram of the sampling-and-holding circuit 25. As shown in FIG. 17, the sampling-and-holding pulse SHD from the phase regulating circuit 1630*e* is input to a signal ON/OFF switch for a capacitor, which holds a sampling value in the sampling-and-holding circuit 25. As shown in FIG. 18, a sampling process (sampling timing) is started at a falling edge of the sampling-and-holding pulse SHD, and the sampling process is finished and a holding process (holding timing) is started at a rising edge thereof.

The process of sampling and holding needs to be performed within an image signal period (ISP) of the analog image signal (CCDOUT) output from the CCD line image sensor 13. More particularly, the holding timing shown in FIG. 18 needs to occur within the image signal period. Moreover, a necessary sampling period (NSP), which the sampling-and-holding circuit 25 requires to perform sampling, also needs to occur within the image signal period.

Usually, the overall sampling period of the sampling-and-holding circuit 25 is longer than the necessary sampling period. Thus, as long as the necessary sampling period is secured, it does not matter whether the sampling timing occurs within the image signal period.

However, as shown in FIG. 19, there is a possibility that the holding timing does not occur within the image signal period due to various reasons. Such a problem can occur, for example, if there is fluctuation in the output delay of the sampling-and-holding pulse SHD at the buffer 30*p* or fluctuation in a time constant of the transmission line between the phase regulating circuit 1630*e* and the sampling-and-holding circuit 25. The same problem can also occur if there is fluctuation in the output delay of the driving pulse for the CCD line image sensor 13 at a corresponding buffer (not shown), or fluctuation in a time constant of the transmission line for the CCD line image sensor 13, or fluctuation in the amount of output delay of the analog image signal from the CCD line image sensor 13.

A conventional technology has been disclosed, for example, in Japanese Patent Application Laid-open No. 2000-307852.

If such problems keep on occurring over a period of time, it becomes difficult to secure an optimal holding timing and the necessary sampling period. Moreover, with the advance of high-speed image reading devices, the increase in pixel frequency has resulted in a shorter image signal period. Thus, it has become further difficult to secure the holding timing and the necessary sampling period.

If the holding timing does not occur within the image signal period, a signal level of the sampling-and-holding circuit 25 deviates from an ideal signal level thereby affecting the output of the image reading device and degrading the image quality. Moreover, if a timing-based sampling and holding is performed on an image signal component that has a high degree of fluctuation in the signal level (see FIG. 19), then a signal-to-noise ratio in the image signal output deteriorates thereby resulting in degradation of the image quality.

SUMMARY OF THE INVENTION

It is an object of the present invention to at least partially solve the problems in the conventional technology.

According to an aspect of the present invention, there is provided an image reading device that includes a light source that illuminates an original; an image sensor that receives a light reflected from the original and outputs an image signal corresponding to the light in synchronization with an input of a timing signal at a plurality of timings; a timing generating unit that generates a sampling-and-holding timing based on the timing signals; a sampling-and-holding circuit that generates a plurality of analog image signals by sampling the image signal at each sampling-and-holding timing and holding sampled image signals for a predetermined amount of time, and outputs the analog image signals; an analog-to-digital converting unit that performs signal quantization of the analog image signals to obtain a plurality of digital image signals at each sampling-and-holding timing and outputs the digital image signals; a phase regulating unit that performs phase regulation of each sampling-and-holding timing based on corresponding digital image signals to obtain phase-regulated sampling-and-holding timing; and an image processing unit that performs image processing on the digital image signals obtained at an optimum phase-regulated sampling-and-holding timing. The sampling-and-holding circuit generates the analog image signal at each phase-regulated sampling-and-holding timing.

According to another aspect of the present invention, there is provided an image reading method that includes receiving a light reflected from the original and outputting an image signal corresponding to the light in synchronization with an input of a timing signal at a plurality of timings; generating a sampling-and-holding timing based on the timing signals; generating a plurality of analog image signals by sampling the image signal at each sampling-and-holding timing and holding sampled image signals for a predetermined amount of time and outputting the analog image signals; performing signal quantization of the analog image signals to obtain a plurality of digital image signals at each sampling-and-holding timing and outputting the digital image signals; performing phase regulation of each sampling-and-holding timing based on corresponding digital image signals to obtain phase-regulated sampling-and-holding timing; and performing image processing on the digital image signals obtained at an optimum phase-regulated sampling-and-holding timing. The generating includes generating the analog image signal at each phase-regulated sampling-and-holding timing.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a signal waveform diagram for explaining generation of a sampling-and-holding pulse in the signal processing unit;

FIG. 3 is a time chart of a line clamp signal, the sampling-and-holding pulse, and an analog image signal, which is output from a line image sensor in the signal processing unit;

FIG. 6 is a flowchart for explaining a process of determining a sampling-and-holding timing according to the first embodiment;

FIG. 7 is a flowchart for explaining a process of determining the sampling-and-holding timing according to a second embodiment of the present invention;

FIG. 9 is a flowchart for explaining a process of determining the sampling-and-holding timing according to a third embodiment of the present invention;

FIG. 18 is a waveform diagram for explaining an exemplary sampling-and-holding timing; and FIG. 19 is a waveform diagram for explaining a problem regarding the sampling-and-holding timing.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
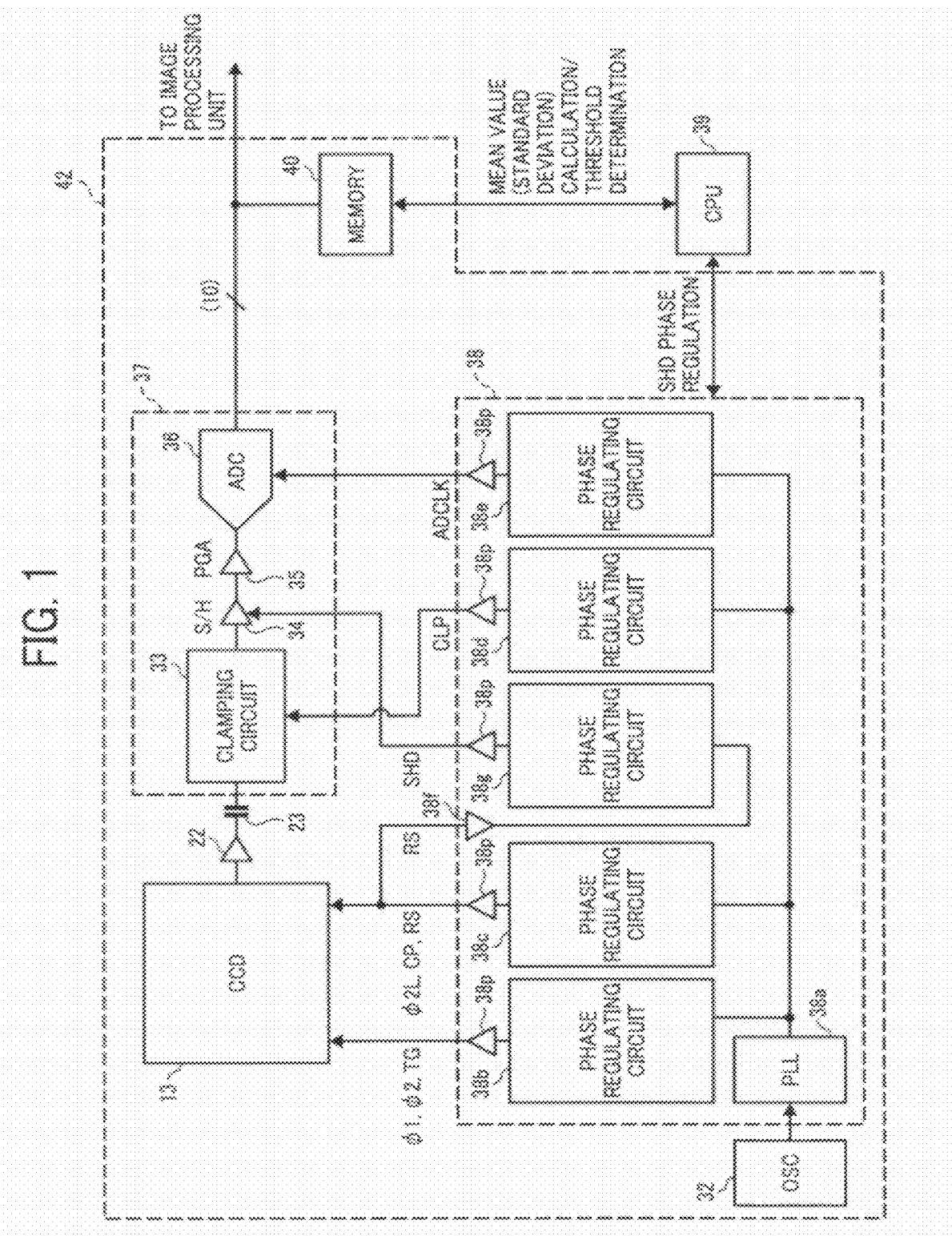
FIG. 1 is a schematic diagram of a signal processing unit in an image reading device according to a first embodiment of the present invention.
Figure 4A:
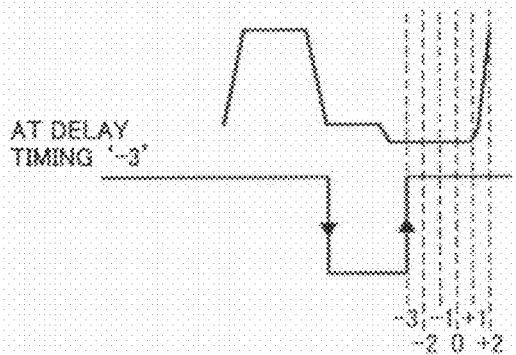
FIG. 4A is a partial waveform diagram when a delay timing '−3' is set as an initial sampling-and-holding timing.
Figure 4B:
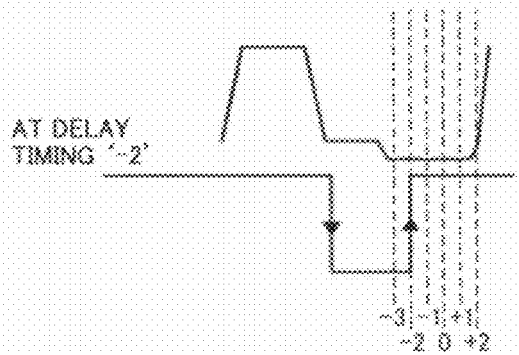
FIG. 4B is a partial waveform diagram when a delay timing '−2' is set as an initial sampling-and-holding timing.
Figure 4C:
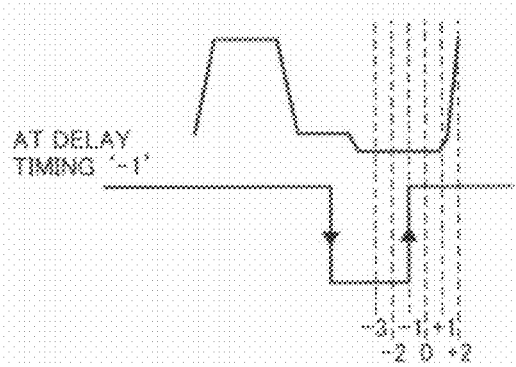
FIG. 4C is a partial waveform diagram when a delay timing '−1' is set as an initial sampling-and-holding timing.
Figure 4D:
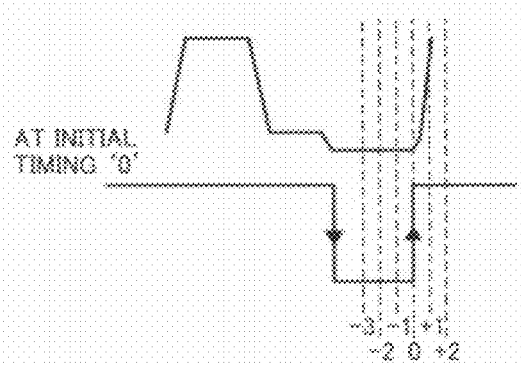
FIG. 4D is a partial waveform diagram when a delay timing '0' is set as an initial sampling-and-holding timing.
Figure 4E:
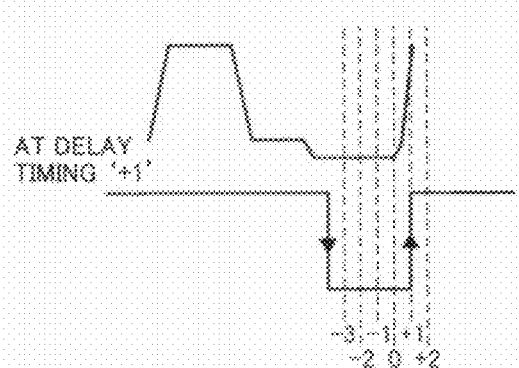
FIG. 4E is a partial waveform diagram when a delay timing '+1' is set as an initial sampling-and-holding timing.
Figure 4F:
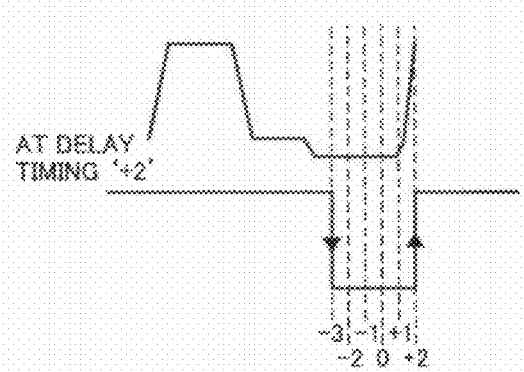
FIG. 4F is a partial waveform diagram when a delay timing '+2' is set as an initial sampling-and-holding timing.
Figure 15:
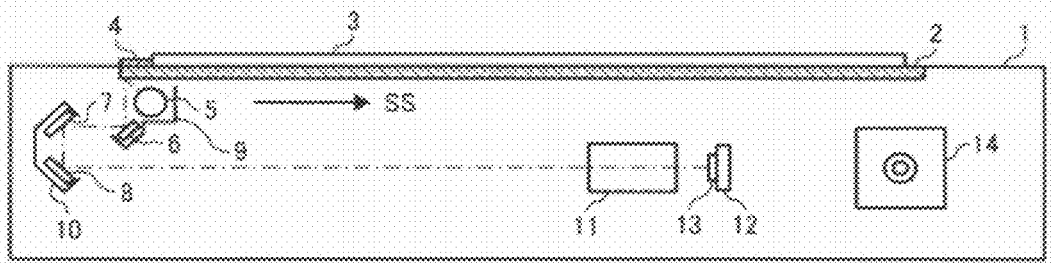
FIG. 15 is a schematic diagram of an optical system in a typical image reading device.
Figure 16:
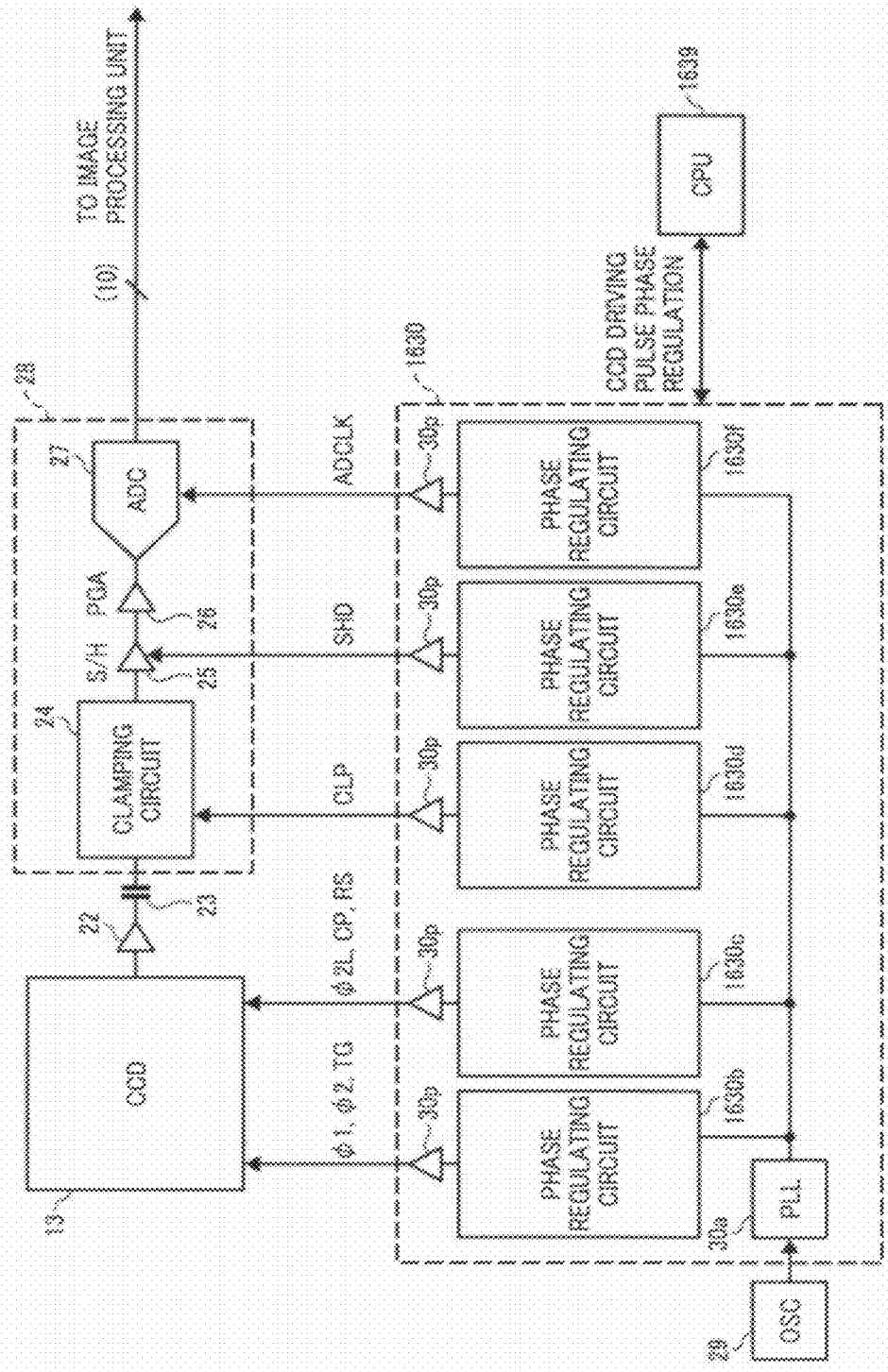
FIG. 16 is a schematic diagram of a signal processing unit in a conventional image reading device.

FIG. 1 is a schematic diagram of a signal processing unit 42 in an image reading device according to a first embodiment of the present invention. The basic configuration of the optical reading system in the image reading device is identical to the optical reading system described with reference to FIG. 15. Moreover, the constituent elements of the image reading device in FIG. 1 having the same or similar structure/function to those in FIG. 16 are referred to by the same reference numerals.

The signal processing unit 42 includes the charged-coupled device (CCD) line image sensor 13, the buffer circuit 22, the capacitor 23, an analog integrated circuit application 37, an oscillator (OSC) 32, a timing signal generating circuit 38, and a memory 40. A central processing unit (CPU) 39 controls the operations of the signal processing unit 42.

The CCD line image sensor 13 outputs an analog image signal in synchronization with input of a driving pulse (a reset signal RS described later). The analog image signal then passes through the buffer circuit 22 to the capacitor 23. The capacitor 23 performs alternating-current (AC) coupling on the analog image signal and outputs AC-coupled analog image signal to the analog integrated circuit application 37, which is an analog front end (AFE).

The analog integrated circuit application 37 includes a clamping circuit 33, a sampling-and-holding circuit (S/H) 34, a programmable gain amplifier (PGA) 35, and an analog-to-digital converting (ADC) circuit 36. In the analog integrated circuit application 37, the clamping circuit 33 receives the AC-coupled analog image signal from the capacitor 23 and clamps a black offset level of the AC-coupled analog image signal to a predetermined voltage in synchronization with input of a clamp signal CLP and outputs the clamped analog image signal.

Figure 17:
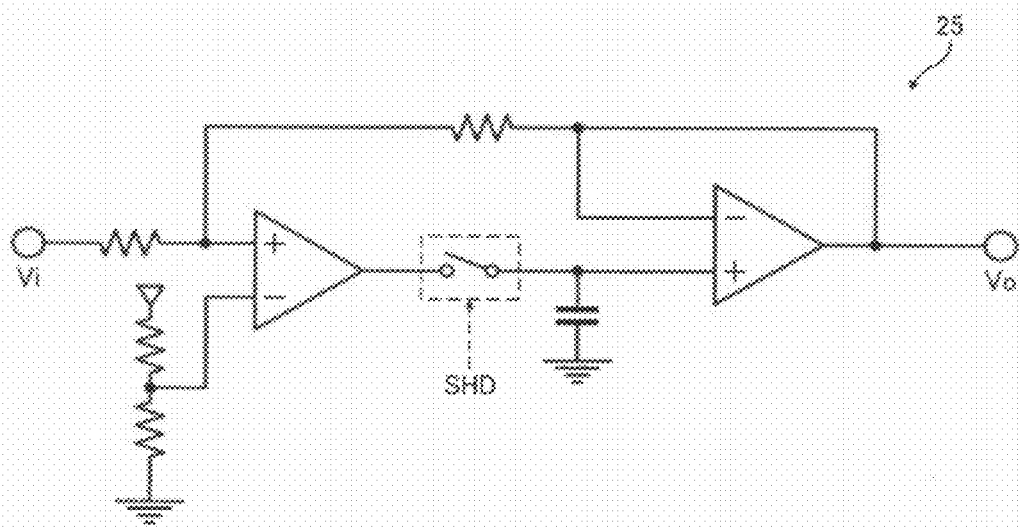
FIG. 17 is a circuit diagram of a typical sampling-and-holding circuit.

The sampling-and-holding circuit 34 outputs a continuous analog image signal by sampling the clamped analog image signal in synchronization with input of a sampling-and-holding pulse SHD and holding the sampled analog image signal for a predetermined amount of time. The PGA 35 amplifies the continuous analog image signal to a predetermined signal level and outputs the amplified analog image signal. The ADC circuit 36 then converts the amplified analog image signal into, e.g., a 10-bit digital image signal in synchronization with input of a conversion timing signal ADCLK and outputs the digital image signal to an image processing unit (not shown) arranged subsequently. The sampling-and-holding circuit 34 has a structure identical to the sampling-and-holding circuit 25 shown in FIG. 17.

Meanwhile, the light source 5 also illuminates the white standard board 4 such that the CCD line image sensor 13 receives the light reflected from the white standard board 4. Based on that, a shading correction circuit (not shown) in the image processing unit obtains a predetermined level of image density and corrects sensitivity fluctuation of the CCD line image sensor 13 or unevenness in the light distribution of the optical system in the image reading device. Moreover, the shading correction circuit also performs digital processing such as gamma correction on the digital image signals. Digital image signals of a predetermined number of pixels (e.g., pixels in one scanning line) are stored in the memory 40.

The timing signal generating circuit 38 generates various timing signals necessary for driving the CCD line image sensor 13 and the analog integrated circuit application 37 based on an output signal of the oscillator 32, and outputs the timing signals to the CCD line image sensor 13 and each circuit in the analog integrated circuit application 37. The CPU 39 controls phase regulation of the sampling-and-holding pulse SHD, which is generated in the timing signal generating circuit 38, and refers to the digital image signals stored in the memory 40.

The timing signal generating circuit 38 includes a phase locked loop (PLL) circuit 38a, five phase regulating circuits 38b, 38c, 38d, 38e, and 38g, a buffer 38f corresponding to each of the phase regulating circuits, and a buffer 38p.

The PLL circuit 38a performs signal multiplication on the output signal of the oscillator 32 and transmits the multiplied output signal to the phase regulating circuits 38b, 38c, 38d, and 38*e*. The multiplied output signal is appropriately divided between the phase regulating circuits 38*b*, 38*c*, 38*d*, and 38*e* for generating necessary timing signals.

More particularly, the phase regulating circuit 38*b* generates clock signals φ1 and φ2 used for sampling of an image light in the CCD line image sensor 13, and a timing signal TG. The phase regulating circuit 38*c* generates clock signals φ2L and CP used for the signal output from the CCD line image sensor 13, and the reset signal RS. The reset signal RS is a timing signal for driving the CCD line image sensor 13. The phase regulating circuit 38*d* generates the clamp signal CLP and outputs it to the clamping circuit 33. The phase regulating circuit 38*e* generates a conversion timing signal ADCLK and outputs it to the ADC circuit 36.

The phase regulating circuit 38*g* generates the sampling-and-holding pulse SHD based on the reset signal RS and outputs the sampling-and-holding pulse SHD to the sampling-and-holding circuit 34. More particularly, the phase regulating circuit 38*c* outputs the reset signal RS to the CCD line image sensor 13 as well as to the phase regulating circuit 38*g* via the buffer 38*f*. The phase regulating circuit 38*g* generates the sampling-and-holding pulse SHD at a timing delayed by a fixed amount with respect to a rising edge of the reset signal RS (see FIG. 2). The phase regulating circuit 38*g* performs phase comparison of an external clock (i.e., the reset signal RS) and an internal clock (i.e., the sampling-and-holding pulse SHD) in the PLL circuit 38*a*, varies the amount of delay, and matches the phase of the external clock with the phase of the internal clock. Thus, even if the phase is affected due to a problem such as noise, the amount of signal delay fluctuates only slightly and remains stable by and large.

As shown in FIG. 2, a reset noise is generated at a timing that occurs after an image signal period of the analog image signal (CCDOUT). The reset noise timing is slightly delayed with respect to a timing phase of the reset signal RS. Thus, to make sure that the holding timing, which is a timing at which a sampling process ends and a holding process starts, of the sampling-and-holding pulse SHD occurs within the image signal period of the CCD line image sensor 13, the phase regulation is performed such that the holding timing occurs before the rising edge of the reset signal RS. Although the holding timing decided in this manner is not an optimal timing to start sampling and holding, it can be considered as an initial timing (indicated as a delay timing '0' in FIG. 2) for sampling and holding. The sampling timing, which is a timing at which a sampling process starts, and the holding timing of the sampling-and-holding pulse SHD is combinedly referred to as a sampling-and-holding timing (operational timing).

During phase regulation, the CPU 39 varies the initial timing (delay timing '0') of the phase regulating circuit 38*g*. The delay timing is varied, as shown in FIG. 3 and FIGS. 4A to 4F, in steps within an effective pixel area of one line in the main scanning direction of the CCD line image sensor 13, and not for each main scanning line period of the CCD line image sensor 13. The initial timing is employed for all other areas in one line in the main scanning direction. The digital image signals at each delay timing are stored in the memory 40. The CPU 39 then calculates a mean value of stored digital image signals corresponding to each delay timing. Meanwhile, in this case, the number of digital image signals at each delay timing is considered to be 64. However, the number is not limited to 64 as long as there is a plurality of digital image signals for calculating the mean value.

Figure 5:
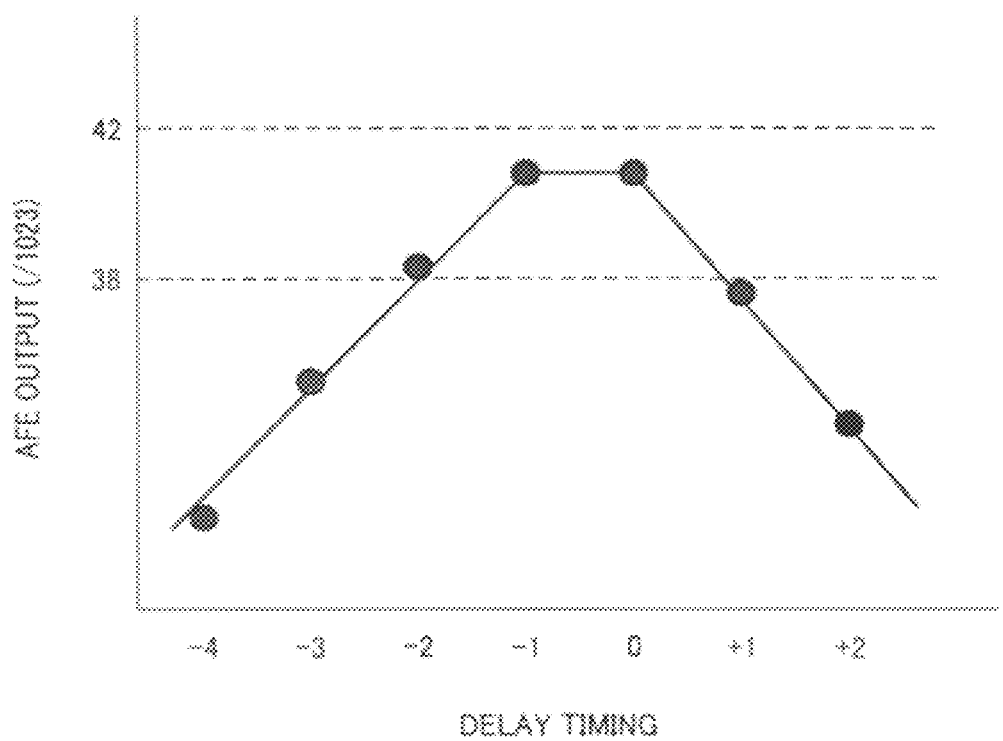
FIG. 5 is a graph of a mean value of AFE output at each delay timing.

FIG. 5 is a graph of the mean value at each delay timing. Consider a case in which an expected range of mean values is set to be 40 LSB±2 LSB at 10 bits, where LSB (least significant bit) is an analog quantization unit corresponding to one digital unit. Consequently, as shown in FIG. 5, if the delay timing is after the initial timing '0', the holding timing occurs within the reset noise timing thereby resulting in deviation of the signal level from the expected range. On the other hand, if the delay timing occurs before the initial timing '0', although the holding timing occurs within the image signal period, it becomes difficult to secure the necessary sampling period thereby resulting in deviation of the signal level from the expected range. The CPU 39 stores in the memory 40 a mean value, which lies within the expected range at each delay timing, and the corresponding delay timing which allows the CPU 39 to select an optimal sampling-and-holding timing.

In the graph shown in FIG. 5, the mean values corresponding to the delay timings '−2', '−1', and '0' are within the expected range (40 LSB±2 LSB). The CPU 39 obtains those delay timings and by taking into consideration the necessary sampling period, selects the delay timing '−1', which is at the center of the delay timings '−2', '−1', and '0', as an optimal sampling-and-holding timing.

Meanwhile, if, a mean value at the initial timing (delay timing '0') does not lie within the expected range due to a signal delay, the CPU 39 increments or decrements the delay timing '0' by one, resets the initial timing to a delay timing '+1' or the delay timing '−1', and obtains the mean value at the new initial timing.

FIG. 6 is a flowchart for explaining a process of determining the sampling-and-holding timing according to the first embodiment.

First, the CPU 39 sets the initial timing at the delay timing '0' (Step S11) and stores the digital image signals (64 in this case) output at a single sampling-and-holding timing from the ADC 36 in the memory 40 (Step S12). The CPU 39 then reads the digital image signals from the memory 40 and calculates a mean value thereof (Step S13), and determines whether the mean value is within the expected range (40 LSB±2 LSB) (Step S14).

If the mean value is within the expected range (Yes at Step S14), then the CPU 39 stores the mean value along with the delay timing '0' in the memory 40 (Step S15). If the mean value is outside the expected range (No at Step S14), the mean value is not stored in the memory 40.

The CPU 39 determines whether the process from Step S12 to Step S15 has been performed for each delay timing (Step S16). If the process is not yet performed for each delay timing (No at Step S16), the CPU 39 keeps incrementing or decrementing the current delay timing by one (Step S17) such that the process from Step S12 to Step S15 is performed for each delay timing.

If the process from Step S12 to Step S15 has been performed for each delay timing (Yes at Step S16), the CPU 39 selects a delay timing at the center of all the delay timings stored in the memory 40 as the optimal sampling-and-holding timing (Step S18). The sampling-and-holding circuit 34 outputs the analog image signal at the optimal sampling-and-holding timing selected by the CPU 39 to the image processing unit.

If the image reading device is adjusted such that the optimal sampling-and-holding timing is set each time the power supply of the image reading device is switched ON, or before delivering the image reading device to a client, then generation of an irregular sampling-and-holding timing due to fluctuation in signal delay in signals that drive the CCD line image sensor 13 or the analog integrated circuit application 37 can be prevented. This will lead to improvement in the image quality.

Thus, because the CPU 39 calculates the mean value of the stored digital image signals corresponding to each delay timing, determines whether the mean value is within an expected range, and selects a delay timing at which the mean value is within the expected range as the optimal sampling-and-holding timing, it is possible to determine an optimal sampling-and-holding timing and obtain a high quality image output.

Meanwhile, an initial timing set before performing the phase regulation needs to secure sufficient, if not optimal, output period for the analog image signal (CCDOUT) output from the CCD line image sensor 13. To achieve that, according to the first embodiment, the sampling-and-holding pulse SHD is generated based on the reset signal RS. As a result, it is possible to negate the fluctuation in signal delay from the CCD line image sensor 13 and perform correct sampling and holding by using the initial timing.

Moreover, as described above, because the sampling-and-holding timing is varied in steps within one line in the main scanning direction, less time is required to calculate the mean values.

Given below is the description of a second embodiment of the present invention. The signal processing unit 42 according to the second embodiment has an identical configuration as that of the signal processing unit 42 according to the first embodiment. Hence, the constituent elements of the signal processing unit 42 are referred to by the same reference numerals and their description is not repeated.

As in the case of the first embodiment, the CPU 39 in the second embodiment calculates a mean value of digital image signals corresponding to each delay timing. However, in the second embodiment, the CPU 39 selects as an optimal sampling-and-holding timing a delay timing at which the mean value has the minimum difference with the mean values at adjacent delay timings. More particularly, the CPU 39 calculates a first difference between a mean value of a certain delay timing and a mean value of a delay timing previous to the certain delay timing, and a second difference between the mean value of the certain delay timing and a mean value of a delay timing subsequent to the certain delay timing. The CPU 39 then calculates a sum of the first difference and the second difference (sum of differences) at each delay timing and selects the delay timing at which the sum of differences is minimum as the optimal sampling-and-holding timing. In this way, it is possible to determine a stable sampling-and-holding timing.

Figure 8A:
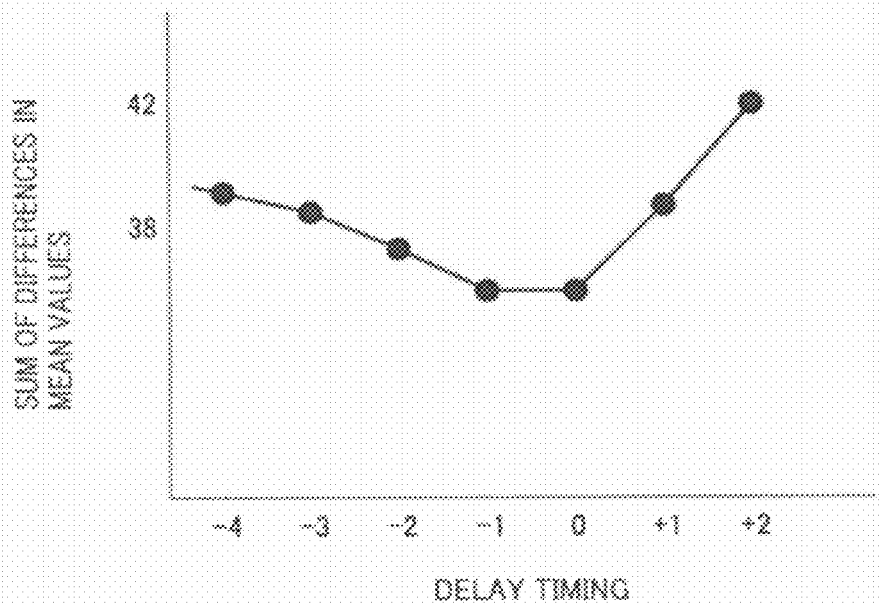
FIG. 8A is a graph of a sum of differences in the mean values with respect to each delay timing.

FIG. 8A is a graph of the sum of differences at each delay timing. In that case, the CPU 39 selects the delay timing '−1' as the optimal sampling-and-holding timing.

FIG. 7 is a flowchart for explaining a process of determining the sampling-and-holding timing according to the second embodiment.

First, the CPU 39 sets the initial timing at the delay timing '0' (Step S21) and stores the digital image signals (64 in this case) output at a single sampling-and-holding timing from the ADC 36 in the memory 40 (Step S22). The CPU 39 then reads the digital image signals from the memory 40 and calculates a mean value thereof (Step S23), and stores the mean value along with the delay timing '0' in the memory 40 (Step S24).

The CPU 39 determines whether the process from Step S22 to Step S24 has been performed for each delay timing (Step S25). If the process is not yet performed for each delay timing (No at Step S25), the CPU 39 keeps incrementing or decrementing the current delay timing by one (Step S26), such that the process from Step S22 to Step S24 is performed for each delay timing.

If the process from Step S22 to Step S24 has been performed for each delay timing (Yes at Step S25), the CPU 39 refers the memory 40 for calculating a first difference between a mean value of a certain delay timing and a mean value of a delay timing previous to the certain delay timing, and a second difference between a mean value of the certain delay timing and a mean value of a delay timing subsequent to the certain delay timing, and calculates a sum of the first difference and the second difference (sum of differences) at each delay timing (Step S27).

The CPU 39 selects a delay timing having the minimum sum of differences as the optimal sampling-and-holding timing (Step S28). The sampling-and-holding circuit 34 outputs the analog image signal at the optimal sampling-and-holding timing selected by the CPU 39 to the image processing unit.

Thus, while determining the sampling-and-holding timing according to the second embodiment, first, the mean value at each delay timing is calculated. Then, the differences in the mean value at each delay timing with the mean values of adjacent delay timings are obtained. Lastly, the differences in the mean values at each delay timing are added together. The delay timings having a large sum of differences are determined to be the timings outside the image signal period of the analog image signal (CCDOUT). On the other hand, a delay timing having the minimum sum of differences is determined to be the optimal sampling-and-holding timing. In this way, an optimal sampling-and-holding timing can be determined to obtain a high quality image output.

Given below is the description of a third embodiment of the present invention. The signal processing unit 42 according to the third embodiment has an identical configuration as that of the signal processing unit 42 according to the first embodiment. Hence, the constituent elements of the signal processing unit 42 are referred to by the same reference numerals and their description is not repeated.

The CPU 39 according to the third embodiment obtains a standard deviation (amount of signal fluctuation) in the digital image signals at each delay timing and selects a delay timing having the standard deviation less than a predetermined threshold as the optimal sampling-and-holding timing. That is, a stable delay timing at which there is less signal fluctuation in the digital image signals is selected as the sampling-and-holding timing. More particularly, the CPU 39 selects the delay timing having the minimum standard deviation as the optimal sampling-and-holding timing. However, any delay timing having the standard deviation less than a predetermined threshold can be considered as the optimal sampling-and-holding timing.

Figure 8B:
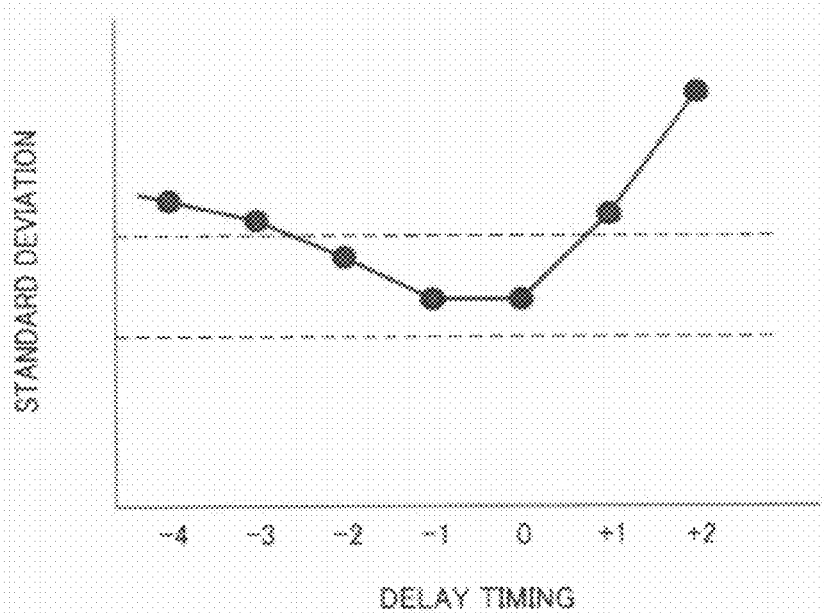
FIG. 8B is a graph of a standard deviation in the digital image signals at each delay timing.

FIG. 8B is a graph of the standard deviation in the digital image signals at each delay timing. In that case, the CPU 39 selects the delay timing '−1' as the optimal sampling-and-holding timing.

FIG. 9 is a flowchart for explaining a process of determining the sampling-and-holding timing according to the third embodiment.

First, the CPU 39 sets the initial timing at the delay timing '0' (Step S31) and stores the digital image signals (64 in this case) output at a single sampling-and-holding timing from the ADC 36 in the memory 40 (Step S32). The CPU 39 then reads the digital image signals from the memory 40 and calculates a standard deviation thereof (Step S33), and stores the standard deviation along with the delay timing '0' in the memory 40 (Step S34).

The CPU 39 determines whether the process from Step S32 to Step S34 has been performed for each delay timing (Step S35). If the process is not yet performed for each delay timing (No at Step S35), the CPU 39 keeps incrementing or decrementing the current delay timing by one (Step S36) such that the process from Step S32 to Step S34 is performed for each delay timing.

If the process from Step S32 to Step S34 has been performed for each delay timing (Yes at Step S35), the CPU 39 refers the memory 40 and selects a delay timing having the minimum standard deviation as the optimal sampling-and-holding timing (Step S37). The sampling-and-holding circuit 34 outputs the analog image signal at the optimal sampling-and-holding timing selected by the CPU 39 to the image processing unit.

Thus, the standard deviation in the data image signals at each delay timing is obtained to determine the sampling-and-holding timing according to the third embodiment. Because a waveform of the digital image signals shows a steep change at timings outside the image signal period of the analog image signal (CCDOUT), it is first determined whether the standard deviation at each delay timing is within a permissible range. Then, the delay timing having the minimum standard deviation within the permissible range is selected as the optimal sampling-and-holding timing. In this way, an optimal sampling-and-holding timing can be determined to obtain a high quality image output.

Figure 10:
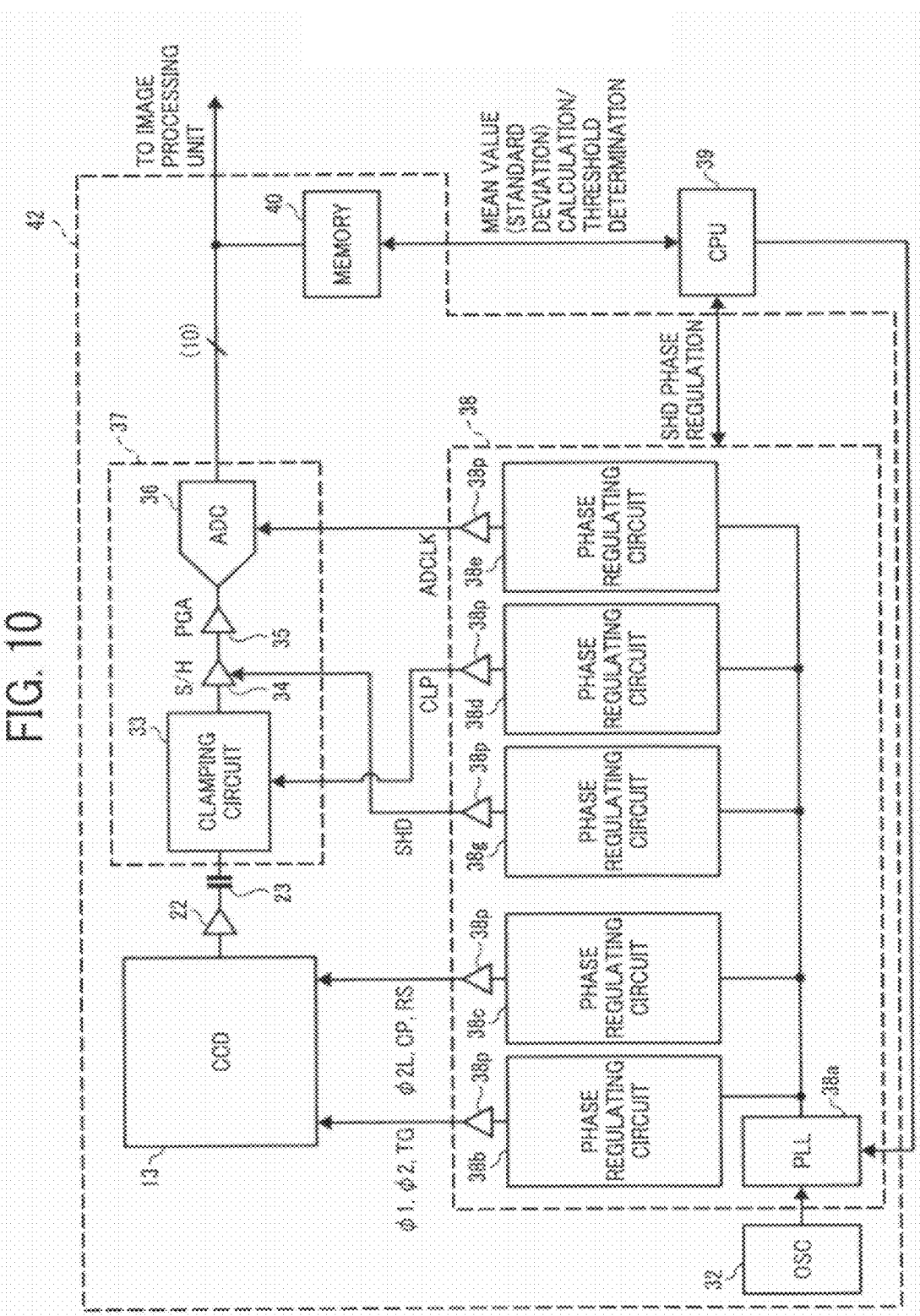
FIG. 10 is a schematic diagram for explaining a signal processing unit in an image reading device according to a fourth embodiment of the present invention.

Given below is the description of a fourth embodiment of the present invention. FIG. 10 is a schematic diagram for explaining the signal processing unit 42 in an image reading device according to the fourth embodiment. The basic configuration of the optical reading system in the image reading device is identical to the optical reading system described with reference to FIG. 15. Moreover, the constituent elements of the image reading device in FIG. 10 having the same or similar structure/function to those in FIG. 1 are referred to by the same reference numerals.

In the fourth embodiment, the phase regulating circuit 38g generates the sampling-and-holding pulse SHD based on the output signal of the PLL circuit 38a and outputs the sampling-and-holding pulse SHD to the sampling-and-holding circuit 34.

More particularly, the PLL circuit 38a performs signal multiplication on the output signal of the oscillator 32 and transmits the multiplied output signal to the phase regulating circuits 38b, 38c, 38d, 38e, and 38g. The multiplied output signal is then properly divided between the phase regulating circuits 38b, 38c, 38d, and 38e for generating necessary timing signals. The phase regulating circuit 38g receives the divided multiplied output signal for generating the sampling-and-holding pulse SHD. Although the phase regulating circuit 38g can delay the phase of the sampling-and-holding pulse SHD by a certain period of time, it is not possible to perform a detailed phase regulation as in the first to third embodiments.

Meanwhile, there are various reasons for the sampling-and-holding timing to fluctuate.

First, the image signal period of the analog image signal, which is output from the CCD line image sensor 13, may fluctuate if there is fluctuation in the output delay at a buffer (not shown) between the timing signal generating circuit 38 and the CCD line image sensor 13, or fluctuation in a time constant of the transmission line for the CCD line image sensor 13, or fluctuation in the amount of output delay of the analog image signal from the CCD line image sensor 13. Moreover, the sampling-and-holding timing may fluctuate if there is fluctuation in the output delay of the sampling-and-holding pulse SHD at the buffer 38p or fluctuation in a time constant of the transmission line between the phase regulating circuit 38g and the sampling-and-holding circuit 34.

Figure 11:
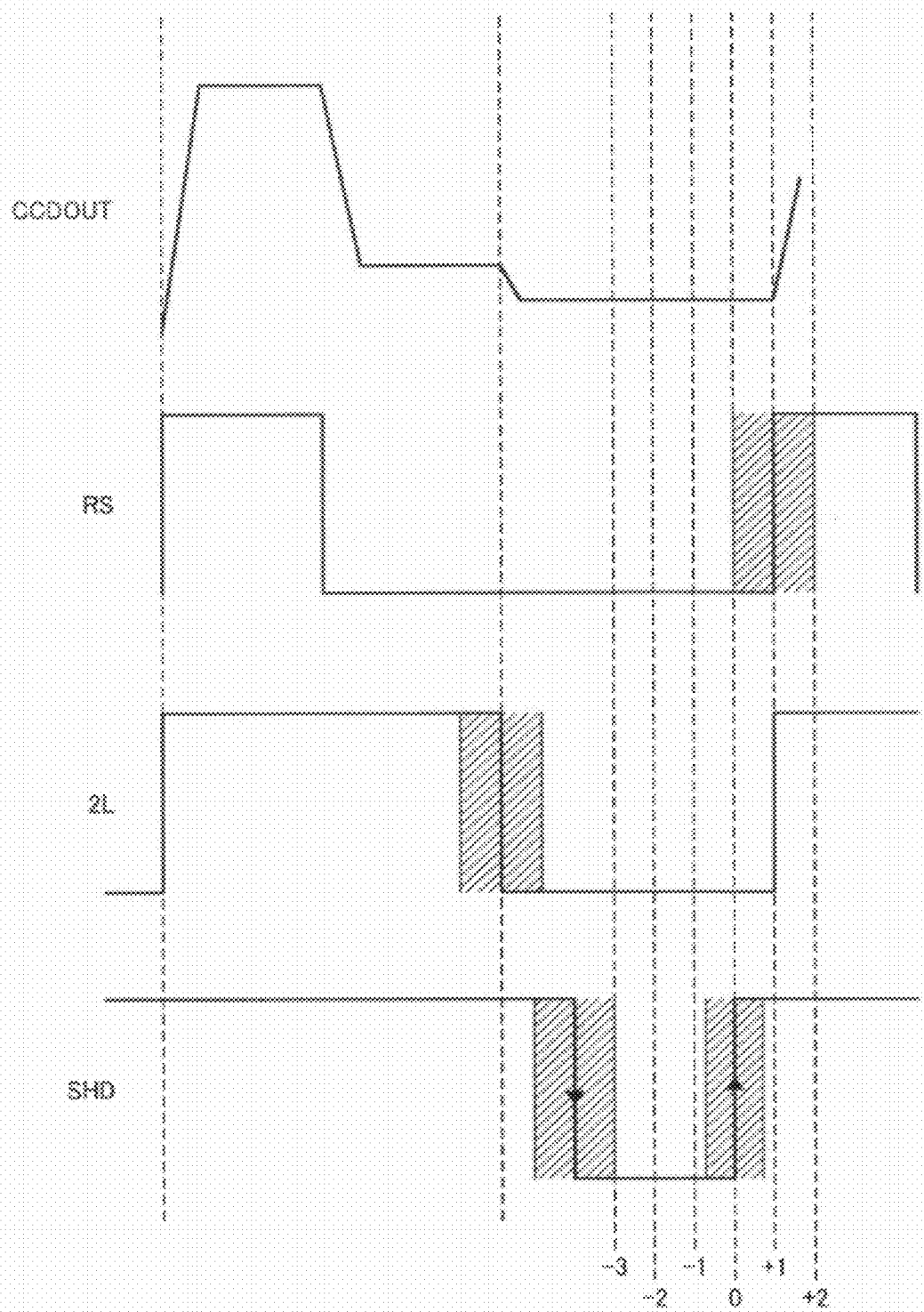
FIG. 11 is a waveform diagram for explaining exemplary initial timings.

If such problems keep on occurring over a period of time, the initial timing can be secured only for a small period of time as shown by shaded portions in FIG. 11. As a result, it becomes difficult to negate the fluctuation in the initial timing.

Figure 12:
FIG. 12 is a waveform diagram for explaining the initial timings when a pixel frequency is reduced to half.

To solve such a problem, the image reading device is adjusted such that the optimal sampling-and-holding timing is set each time the power supply of the image reading device is switched ON, or before delivering the image reading device to a client. More particularly, an operating frequency (image frequency) of the CCD line image sensor 13 and the analog integrated circuit application 37 is adjusted. For that, the CPU 39 instructs the PLL circuit 38a to demultiply a pixel frequency by (1/n)-th (e.g., half) of the original pixel frequency. Because the fluctuation in the initial timing is constant irrespective of the pixel frequency, the demultiplication of the pixel frequency enables to secure the initial timing for a sufficiently large period of time as shown by shaded portions in FIG. 12 thereby enabling to negate the fluctuation in the initial timing.

Consequently, as in the case of the second embodiment, the CPU 39 selects as the optimal sampling-and-holding timing a delay timing at which the mean value of the digital image signals is minimum. The CPU 39 then restores the demultiplied pixel frequency to the original pixel frequency.

Figure 13:
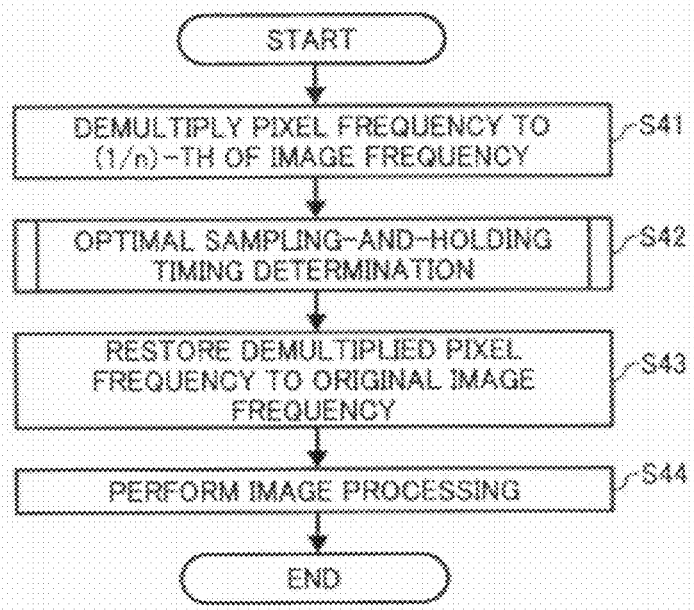
FIG. 13 is a flowchart for explaining a process of determining the sampling-and-holding timing according to the fourth embodiment.

FIG. 13 is a flowchart for explaining a process of determining the sampling-and-holding timing according to the fourth embodiment.

First, upon receiving an instruction from the CPU 39, the PLL circuit 38a demultiplies the pixel frequency to (1/n)-th of the image frequency at the time of image reading (Step S41). Then, the CPU 39 determines the optimal sampling-and-holding timing as described in the first embodiment with reference to FIG. 6 (Step S42). After determining the optimal sampling-and-holding timing, the CPU 39 instructs the PLL circuit 38a to restore the demultiplied pixel frequency to the image frequency at the time of image reading (Step S43). The digital image signals output from the analog integrated circuit application 37 are then subjected to data processing in the image processing unit (Step S44).

As described above, an initial timing set before performing the phase regulation needs to secure sufficient, if not optimal, output period for the analog image signal output from the CCD line image sensor 13. Meanwhile, the signal delay from the CCD line image sensor 13 or the sampling-and-holding timing is constant irrespective of the image frequency. Hence, while determining the sampling-and-holding timing, the image frequency is temporarily reduced such that sufficient initial timing can be secured for performing sampling and holding. Moreover, this method also incorporates the features according to the first embodiment.

Figure 14:
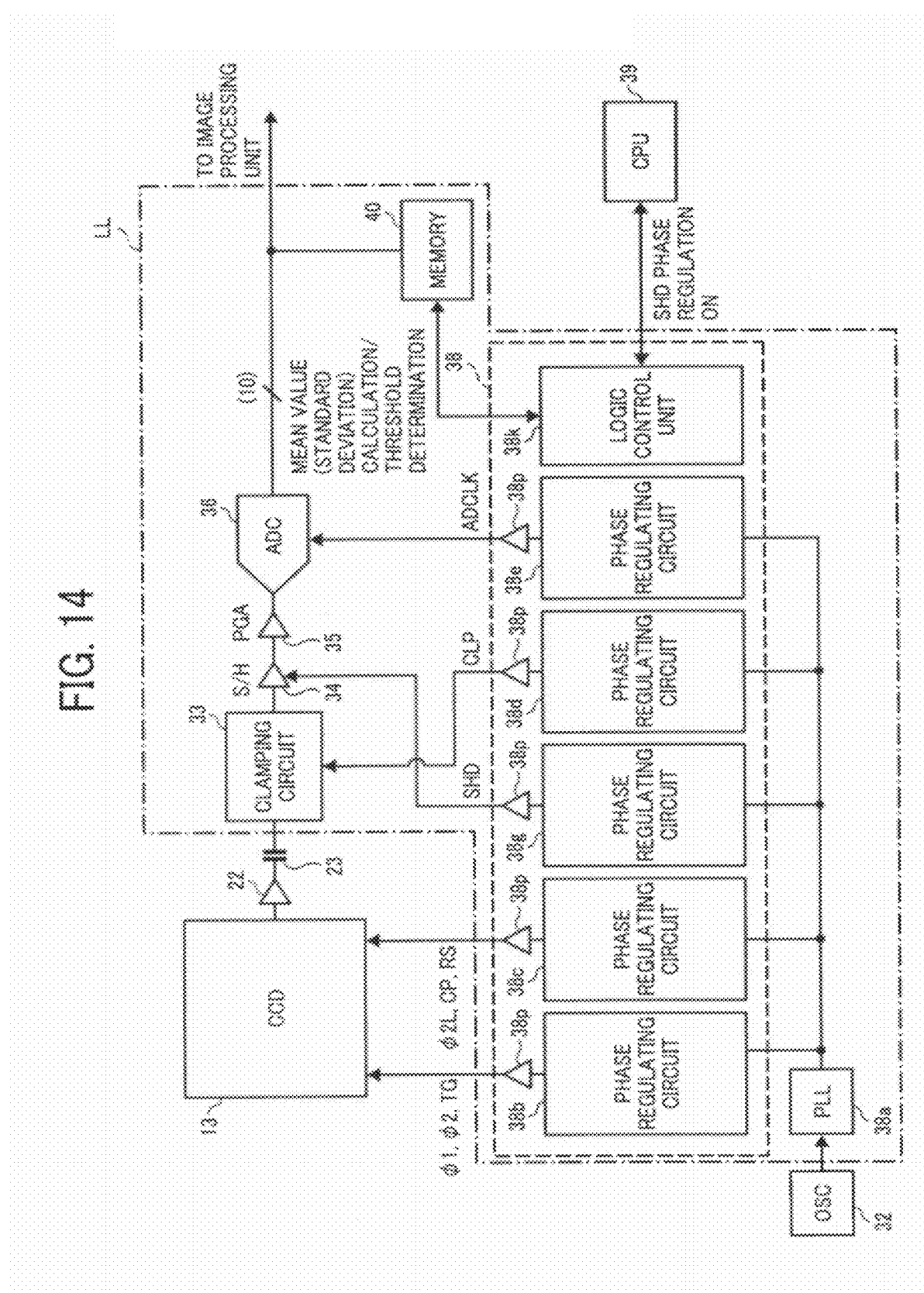
FIG. 14 is a schematic diagram of an integrated circuit device in an image reading device according to a fifth embodiment of the present invention.

Given below is the description of a fifth embodiment of the present invention. FIG. 14 is a schematic diagram of an integrated circuit device LL according to the fifth embodiment. The integrated circuit device LL is configured by integrating the analog integrated circuit application 37, the timing signal generating circuit 38, and the memory 40 according to the first to fourth embodiments.

Meanwhile, the timing signal generating circuit 38 according the fifth embodiment further includes a logic control unit 38k, which is a hardware unit. The logic control unit 38k receives an SHD-phase-regulation ON signal from the CPU 39 and determines the sampling-and-holding timing. Thus, the sampling-and-holding timing is not determined by executing a software program in the CPU 39 but determined by using the logic control unit 38k.

Because of the abovementioned configuration, the processes of generating the sampling-and-holding timings, phase regulation, determining waveform data, and determining the optimal sampling-and-holding timing can be performed in the integrated circuit device LL in an integrated manner. That is, in addition to incorporating the features according to the first embodiment, the optimal sampling-and-holding timing can be determined by using a simple configuration without executing complicated software programs in the CPU 39.

Thus, according to an aspect of the present invention, the fluctuation in signal delay does not result in generation of an irregular sampling-and-holding timing. As a result, a high quality image output can be obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
   a light source that illuminates an original;
   an image sensor that receives a light reflected from the original and outputs an image signal corresponding to the light in synchronization with an input of a timing signal at a plurality of timings;
   a timing generating unit that generates a sampling-and-holding timing based on the timing signals;
   a sampling-and-holding circuit that generates a plurality of analog image signals by sampling the image signal at each sampling-and-holding timing and holding sampled image signals for a predetermined amount of time, and outputs the analog image signals;
   an analog-to-digital converting unit that performs signal quantization of the analog image signals to obtain a plurality of digital image signals at each sampling-and-holding timing and outputs the digital image signals;
   a phase regulating unit that performs phase regulation of each sampling-and-holding timing based on corresponding digital image signals to obtain phase-regulated sampling-and-holding timing; and
   an image processing unit that performs image processing on the digital image signals obtained at an optimal phase-regulated sampling-and-holding timing,
   wherein the sampling-and-holding circuit generates the analog image signal at each phase-regulated sampling-and-holding timing,
   the image reading device further comprising a calculating unit that
      calculates an n-th mean value of the digital image signals at an n-th sampling-and-holding timing, an (n−1)-th mean value of the digital image signals at an (n−1)-th sampling-and-holding timing, and an (n+1)-th mean value of the digital image signals at an (n+1)-th sampling-and-holding timing,
      calculates a first difference between the n-th mean value and the (n−1)-th mean value, and a second difference between the n-th mean value and the (n+1)-th mean value,
      calculates a sum of the first difference and the second difference to obtain a sum of differences at the n-th sampling-and-holding timing, and
      repeats calculating the sum of differences at each sampling-and-holding timing,
   wherein the phase regulating unit selects a sampling-and-holding timing at which the sum of differences is minimum as the optimal sampling-and-holding timing.

2. The image reading device according to claim 1, further comprising a control unit that reduces a first operating frequency of each of the image sensor, the sampling-and-holding circuit, and the analog-to-digital converting unit with respect to a corresponding second operating frequency, the first operating frequency being an operating frequency during phase regulation of each sampling-and-holding timing, the second operating frequency being an operational frequency while reading an image at a time other than phase regulation.

3. The image reading device according to claim 1, wherein the phase regulating unit performs phase regulation of a sampling-and-holding timing based on a digital image signal converted from an analog image signal at a zero light level.

4. An image reading method comprising:
   receiving a light reflected from the original and outputting an image signal corresponding to the light in synchronization with an input of a timing signal at a plurality of timings;
   generating a sampling-and-holding timing based on the timing signals;
   generating a plurality of analog image signals by sampling the image signal at each sampling-and-holding timing and holding sampled image signals for a predetermined amount of time and outputting the analog image signals;
   performing signal quantization of the analog image signals to obtain a plurality of digital image signals at each sampling-and-holding timing and outputting the digital image signals;
   performing phase regulation of each sampling-and-holding timing based on corresponding digital image signals to obtain phase-regulated sampling-and-holding timing; and
   performing image processing on the digital image signals obtained at an optimal phase-regulated sampling-and-holding timing, wherein
   the generating includes generating the analog image signal at each phase-regulated sampling-and-holding timing,
   the image reading method further comprising:
      calculating an n-th mean value of the digital image signals at an n-th sampling-and-holding timing, an (n−1)-th mean value of the digital image signals at an (n−1)-th sampling-and-holding timing, and an (n+1)-th mean value of the digital image signals at an (n+1)-th sampling-and-holding timing,
      calculating a first difference between the n-th mean value and the (n−1)-th mean value, and a second difference between the n-th mean value and the (n+1)-th mean value,
      calculating a sum of the first difference and the second difference to obtain a sum of differences at the n-th sampling-and-holding timing, and
      repeating calculating the sum of differences at each sampling-and-holding timing,
   wherein the performing the phase regulating selects a sampling-and-holding timing at which the sum of differences is minimum as the optimal sampling-and-holding timing.

* * * * *